United States Patent
Britton et al.

(10) Patent No.: US 9,664,573 B2
(45) Date of Patent: May 30, 2017

(54) THERMAL IMAGING SENSORS

(71) Applicant: PST Sensors (Proprietary) Limited, Cape Town (ZA)

(72) Inventors: David Thomas Britton, Cape Town (ZA); Margit Harting, Cape Town (ZA)

(73) Assignee: PST SENSORS (PROPRIETARY) LIMITED, Cape Town (ZA)

( * ) Notice: Subject to any disclaimer, the term of this patent is extended or adjusted under 35 U.S.C. 154(b) by 0 days.

(21) Appl. No.: 14/375,459

(22) PCT Filed: Jan. 30, 2013

(86) PCT No.: PCT/IB2013/050780
§ 371 (c)(1),
(2) Date: Jul. 30, 2014

(87) PCT Pub. No.: WO2013/114291
PCT Pub. Date: Aug. 8, 2013

(65) Prior Publication Data
US 2015/0007665 A1  Jan. 8, 2015

(30) Foreign Application Priority Data

Jan. 30, 2012 (ZA) .................. 2012/00708

(51) Int. Cl.
*G01B 7/16* (2006.01)
*G01K 7/22* (2006.01)
(Continued)

(52) U.S. Cl.
CPC .................. *G01K 7/22* (2013.01); *G01J 1/44* (2013.01); *G01K 1/02* (2013.01); *G01K 7/16* (2013.01);
(Continued)

(58) Field of Classification Search
CPC ............... G01K 7/22; G01K 1/26; G01B 7/16
(Continued)

(56) References Cited

U.S. PATENT DOCUMENTS 3,665,766 A * 5/1972 Johnston .................. G01K 3/02
374/115
3,930,412 A  1/1976 Mallon et al.
(Continued)

FOREIGN PATENT DOCUMENTS

CN         102322974 A      1/2012
WO       WO 01/18515 A      3/2001

OTHER PUBLICATIONS

Yang, Y.J. et al.: "Development of a Flexible Temperature Sensor Array System", *Key Engineering Materials*, vols. 381-382 (2008), pp. 383-386.
(Continued)

*Primary Examiner* — Harshad R Patel
*Assistant Examiner* — Octavia Hollington
(74) *Attorney, Agent, or Firm* — Haug Partners LLP

(57) ABSTRACT

A sensor device comprises an array of spaced apart sensor elements disposed in a pattern on a substrate. Each sensor element is connected electrically so that a physical variable measured by each sensor element independently can be recorded and/or displayed by an external instrument. The sensing device may be a temperature sensing device, in which case the sensor elements are temperature sensing elements such as negative temperature coefficient (NTC) thermistors. Alternatively the sensing device may be a strain or pressure sensing device, or an optical imaging device, in which case the sensor elements include piezoresistors or photoresistors. The sensor elements may be connected in a common source or write all-read one configuration, in a common output or write one-read all configuration, or in an
(Continued)

array comprising X rows and Y columns, in a write X-read Y configuration.

14 Claims, 3 Drawing Sheets

(51) Int. Cl.
    *G01K 7/16*     (2006.01)
    *G01L 1/18*     (2006.01)
    *G01K 1/02*     (2006.01)
    *G01L 9/04*     (2006.01)
    *G01L 1/20*     (2006.01)
    *G01L 1/22*     (2006.01)
    *G01J 1/44*     (2006.01)

(52) U.S. Cl.
    CPC ............... *G01L 1/18* (2013.01); *G01L 1/205* (2013.01); *G01L 1/225* (2013.01); *G01L 9/045* (2013.01); *G01K 2213/00* (2013.01)

(58) Field of Classification Search
    USPC .......................................................... 73/774
    See application file for complete search history.

(56) References Cited

U.S. PATENT DOCUMENTS

| | | | | |
|---|---|---|---|---|
| 4,471,227 A | * | 9/1984 | D'Ascenzo | G06K 9/2009 250/208.1 |
| 4,550,606 A | * | 11/1985 | Drost | B06B 1/0622 310/334 |
| 6,077,228 A | * | 6/2000 | Schonberger | A61B 5/411 374/100 |
| 6,505,522 B1 | * | 1/2003 | Wilssens | G01L 1/205 73/862.51 |
| 6,853,306 B1 | | 2/2005 | Nitschke et al. | |
| 7,049,830 B1 | * | 5/2006 | Thinnes | G01D 5/252 324/691 |
| 7,563,024 B2 | | 7/2009 | Rotem et al. | |
| 8,063,350 B2 | * | 11/2011 | McGarry | H04N 5/2353 250/208.1 |
| 8,706,432 B2 | * | 4/2014 | Dietz | G06F 3/0414 345/10 |
| 9,019,237 B2 | * | 4/2015 | Ludwig | G06F 3/038 345/158 |
| 2002/0109092 A1 | | 8/2002 | Wood | |
| 2003/0103401 A1 | * | 6/2003 | Tran | G11C 11/16 365/211 |
| 2009/0254869 A1 | | 10/2009 | Ludwig et al. | |
| 2010/0274447 A1 | | 10/2010 | Stumpf | |
| 2013/0203201 A1 | * | 8/2013 | Britton | G01K 7/226 438/54 |

OTHER PUBLICATIONS

Mathias, Walter: "Printable Film Sensors", 28$^{th}$ Symposium for passive electronic components, Mar. 17-20, 2008, published by Electronic Components, Assemblies and Materials Association.

Lichtenwalner, Daniel J. et al.: "Flexible thin film temperature and strain sensor array utilizing a novel sensing concept", *Sensors and Actuators A*, 135 (2007), pp. 593-597.

Extended European Search Report from European Patent Office for corresponding European application 13743119.3 dated Nov. 10, 2015.

* cited by examiner

THERMAL IMAGING SENSORS

This application is a 371 of PCT/IB2013/050780 filed on Jan. 30, 2013, published on Aug. 8, 2013 under publication number WO 2013/114291 A and claims priority benefits of South African Patent Application Number 2012/00708 filed Jan. 30, 2012, the disclosure of which is incorporated herein by reference.

BACKGROUND OF THE INVENTION

THIS invention relates to sensor devices such as temperature sensing devices, and to a method of producing such devices.

In many applications, in fields as diverse as engineering, health care, packaging and transport it is desirable to obtain quantitative information on the distribution of the temperature of a relatively large object (for example, a container for liquid or a package containing foodstuffs).

At present the most common method used for this purpose is infrared or visible thermography, in which the thermal radiation emitted by the object is recorded by a digital camera. While having the advantage, for some applications, of being a non-contact measurement, this is often a disadvantage due to factors such as extraneous radiation, poor visibility and obscuring of the field of view, transparency of the material and variations in emissivity and reflectivity. It is therefore often desirable to utilize a sensor which is in good direct thermal contact with the object. Generally this requires either a flexible or conformable sensor array which can be affixed to a non-flat surface.

Presently, when a direct temperature measurement of an object is required, individual discrete components are mounted onto or held in contact with the object. The sensors used are either thermocouples or, more often, resistive devices such as thermistors. The construction, and equally important, the electrical connection of a flexible multi-sensor array can be complex and expensive, as in the device described in U.S. Pat. No. 6,077,228 of Schonberger, for example.

It is an object of the invention to provide an alternative multi-sensor temperature sensing device.

SUMMARY OF THE INVENTION

According to the invention there is provided a sensor device comprising an array of spaced apart sensor elements disposed in a pattern on a substrate, each sensor element comprising a resistive component and being connected electrically so that a physical variable measured by each sensor element independently can be recorded and/or displayed by an external instrument.

The sensing device may be a temperature sensing device, in which case the sensor elements are temperature sensing elements.

The temperature sensing elements may comprise temperature dependent resistors.

Preferably the temperature sensing elements comprise negative temperature coefficient (NIC) thermistors.

Alternatively the sensing device may be a strain or pressure sensing device, or an optical imaging device, in which case the sensor elements may include piezoresistors or photoresistors.

Said at least one sensor element may include at least one series temperature independent measurement resistor.

Said at least one sensor element may include a series temperature independent load resistor and a parallel temperature independent shunt resistor.

In one embodiment, the sensor elements may be connected in a common source or write all-read one configuration.

In another embodiment, the sensor elements may be connected in a common output or write one-read all configuration.

In a further embodiment, the sensor elements may be connected in an array comprising X rows and Y columns, in a write X-read Y configuration.

The positioning and/or size of the individual sensors may be selected to allow the sensor device to be matched to the size, shape and form of an object whose temperature profile (or profile of another physical variable) is to be measured.

The substrate may be flexible or conformable to the shape of an object to be measured.

The sensor elements may be disposed in a pattern which is mapped, in use, in a representation of the measured physical variable.

A preferred embodiment of the invention is a sensor array including sensor elements which are printed on a substrate.

Preferably, other components of the sensor array, including but not limited to temperature independent resistors, conductive tracks and insulators, are also printed on the substrate.

DESCRIPTION OF EMBODIMENTS

Figure 1:
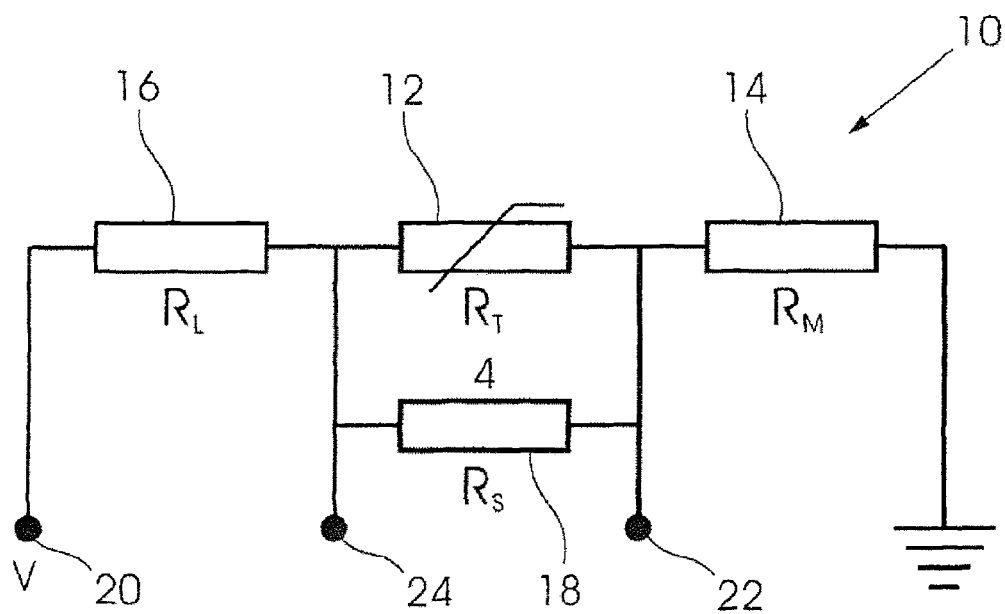
FIG. 1 is a schematic diagram illustrating the principle of operation of the circuit for a single resistive sensing element of a temperature sensing device according to the invention.

For purposes of explanation, the present invention will be described primarily with reference to temperature sensing devices. However, it will be understood that sensing devices for strain or pressure, or optical sensing devices, for example, are other examples of the invention.

The temperature sensing devices of the invention described herein are relatively large area thermal imaging sensors composed of a network of temperature dependent resistors, commonly known as thermistors, and temperature independent fixed resistors. Of particular relevance here are thermistors which have a negative temperature coefficient of resistance, commonly known as NTC thermistors, meaning that their electrical resistance decreases approximately exponentially with increasing temperature.

Thus, one aspect of the present invention provides a plurality of thermistors which are arranged in a temperature sensing array, where the sensors may be individually addressed or addressed as a row and column matrix. (Similarly, the present invention can make use of other resistive sensors, including but not limited to piezoresistors or photoresistors, allowing similar sensor arrays for other applications such as strain and pressure mapping or optical imaging.)

Existing thermistors of this general type are composed of pastes comprised of a powder of a compound semiconductor material and a binder material, such as a glass frit. This paste is either screen printed onto a ceramic substrate or cast to form a green body, after which it is sintered at high temperature to form a massive layer or body of semiconductor material. Invariably, because of distortion during the thermal treatment, further trimming of the material to obtain the correct resistance is required before metallization, in the case of thick-film thermistors.

The fabrication processes used place limitations on the substrate materials that can be used, precluding the use of many lightweight, flexible materials such as paper and polymer film. Traditionally, thick-film inks used for the fabrication of thermistors are composed of heavy metal sulphides and or tellurides, such as lead sulphide, and are not compliant with modern legislation such as the European Restriction on Hazardous Substances (ROHS). Recently introduced alternative materials include compositions of mixtures of rare earth and transition metal oxides, such as manganese oxide. Thermistors based on silicon are usually cut from heavily doped silicon wafers, and have a positive temperature coefficient of resistance.

These fabrication methods are not compatible with the use of conventional thermistors in large area or flexible sensor arrays. Therefore a printed device of the type described by us in PCT/2011/054001 is preferred. In particular, the use of printed negative temperature coefficient thermistors is contemplated.

Although the present invention can be applied to an array of discrete electronic components, the construction of an array of many such sensors would face serious challenges with respect to size, flexibility, and power consumption (leading to self heating).

Depending on the requirements of the application, the substrate on which the sensor is printed may be rigid or flexible as described in PCT/2011/054001. Similarly other components of the sensor array, including but not limited to temperature independent resistors, conductive tracks and insulators may also be printed onto the substrate material. Any commonly known printing process, such as screen printing, gravure printing, flexography and inkjet printing, which are applied in the printed electronics or thick film electronics industries, may be used. Alternatively discrete components may be affixed to the substrate material and connected to each other by any suitable method commonly used in the electronics assembly industry in a similar manner to that described in U.S. Pat. No. 6,077,228 of Schonberger.

As an alternative to an NTC thermistor, a positive temperature coefficient (PTC) thermistor or resistance temperature device (RTD) may be used as the sensor element. The PTC thermistor may be an inorganic semiconductor of conventional art or be manufactured from a semiconducting polymer as described by Panda et al in WO 2012/001465. Similarly the RTD may be manufactured according to any known method, such as forming a wire or thin film of a metal to the appropriate dimensions. Alternatively the RTD may be formed from a highly resistive printed track.

The disadvantages of using an RTD instead of a thermistor are, firstly, that the resistance of the RID and its temperature dependence are comparable to that of the conductive tracks which connect the sensing elements of the array and, secondly, that the relative change in resistance with temperature is small compared to that of a thermistor.

The invention may be similarly applied to the position resolved measurement of any quantity which can be used to induce a change in the electrical conductivity of the material used to form the sensor elements. Known parameters include force and strain, if the material used is piezoresistive, and light if the material exhibits photoconductivity. Alternatively, if the material can be made to interact with chemical species in its immediate environment, for example by the addition of functional groups to nanoparticles in the sensor, or a change of doping level in a semiconducting polymer, a sensor array as described below could be used to generate a chemical map.

FIG. 1 shows the most general electrical circuit of a single sensor 10 which utilizes a thermistor or RID 12. The circuit incorporates a fixed resistor connected in series to enable the determination of the temperature dependent resistance, and optional additional series and parallel resistors to adjust the absolute value of the measured voltage range and the temperature sensitivity. Thus, in addition to a temperature dependent resistor 12 with resistance $R_T$, the circuit contains at least one fixed measurement resistor 14 of resistance $R_M$, an optional fixed load resistor 16 of resistance $R_L$, and an optional fixed shunt resistor 18 of resistance $R_S$. The latter resistors are temperature independent.

When an electric potential V is applied to the terminal 20 the potential difference $V_M$ across the measurement resistor 14 can be measured at the central terminal 22. Alternatively, the potential difference $V_T$ across the thermistor 12 can be measured between the two central terminals 24 and 22. It should be noted that in the case when the load resistor 16 is not present in the circuit, the terminals 20 and 24 are equivalent points in the circuit.

Relative to the applied potential V the two measured potential differences are:

$$\frac{V_M}{V} = \frac{R_M}{\left(R_M + R_L + 1/\left(\frac{1}{R_T} + \frac{1}{R_S}\right)\right)},$$

and $$\frac{V_T}{V} = \frac{R_T R_S}{(R_T + R_S)\left(R_M + R_L + 1/\left(\frac{1}{R_T} + \frac{1}{R_S}\right)\right)}$$

For an NTC thermistor, as the temperature increases $R_T$ decreases and $V_M$ increases. Hence a positive temperature response is obtained for the measurement of $V_M$. Similarly, for a PTC thermistor, $V_T$ increases with increasing temperature. In both cases the presence of the fixed resistors serves to define the voltage range and sensitivity of the output. The fixed resistors may be temperature independent resistors which are included in the sensor element at the point of measurement, or may be any other resistor maintained at a constant temperature at a remote position.

To minimize the effect of fluctuations in the applied potential, it is preferable to measure the ratio of the output potential to the input, and it is further desirable that the fixed resistances are chosen so that at the expected mean temperature this ratio is approximately one half.

Figure 2:
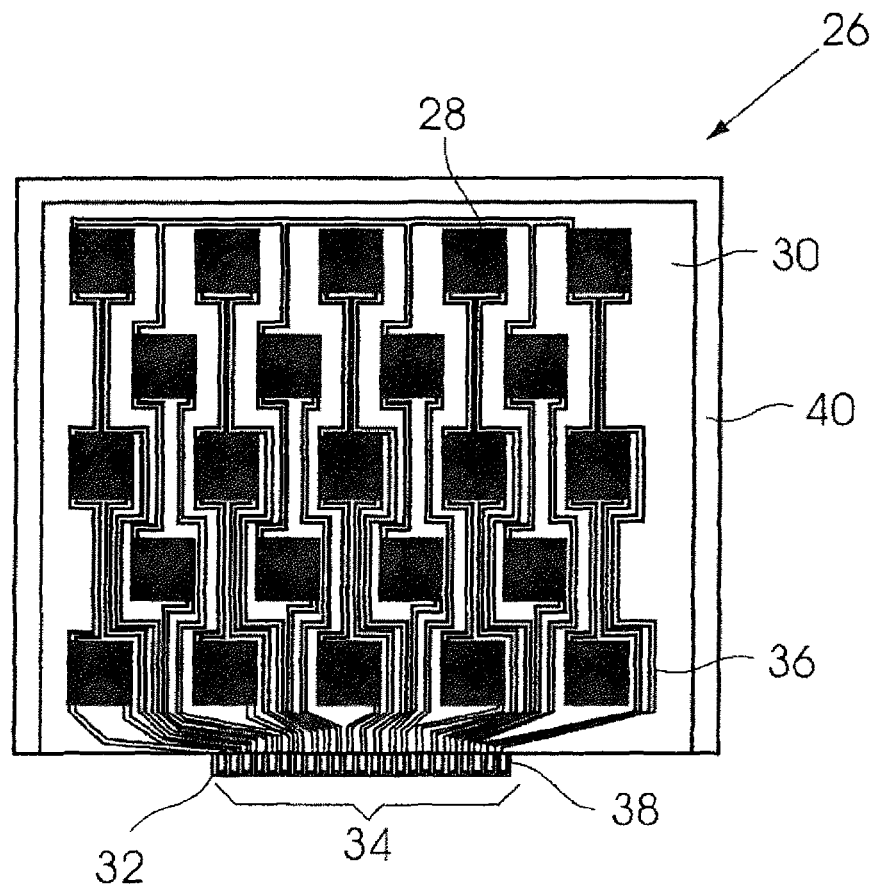
FIG. 2 is a plan view of an example embodiment of a temperature sensing array comprising a plurality of individual sensor elements which can be connected with either a common source or common output.

FIG. 2 is a plan view of an example embodiment of a temperature sensor according to the invention. The sensor comprises a printed array of 23 temperature sensors 28 which are deposited on a substrate 30 and which are each connected to a common terminal 32, and individually connected to independent terminals 34 via printed silver tracks 36 to a card edge connector 38, with 0.1" pitch, at the lower edge of the substrate 30. The individual sensors 28, each approximately 25 mm square, are printed thermistors of an interdigitated design, with printed silver contacts, as disclosed in PC 17182011/053999 and in which the active material is comprised of a printable composition of silicon nanoparticles. The substrate in this example was 180 gsm paper board and the device was laminated with 100 micron PET film to define a protective outer layer 40 for the device.

There is, however, no restriction on the positioning or size of the individual sensors, allowing the design to be matched to the size, shape and form of the object whose temperature profile is to be measured. As an example one could consider the determination of the temperature profile of irregularly shaped container or reaction vessel, which would require different spatial resolution at different positions.

In each of the first two embodiments described below the potential at an input terminal (or terminals) 20 and at a central terminal (or terminals) 22 is measured with an analogue to digital converter which is integrated in a data acquisition system (DAQ). Similarly, the source potential V is obtained from the digital output channels of the DAQ. Recording of the data, calculation of temperature, and its visual representation are then performed with any suitable type of computer, including notebook personal computers and hand-held devices such as mobile communications devices (e.g. cellular telephones, tablet computers and personal digital assistants). Alternatively any suitable microprocessor can be integrated into a dedicated recording instrument.

With the use of software calibration it is only necessary to include the fixed measurement resistors 14 in the sensing circuit. In the first two embodiments, these are standard 1% precision ¼ W metal film resistors located at the input to the DAQ, in a region of relatively constant temperature. The temperature dependent resistance of the sensor is then $$R_T = R_M\left(1 - \frac{V_M}{V}\right).$$

Figure 3:
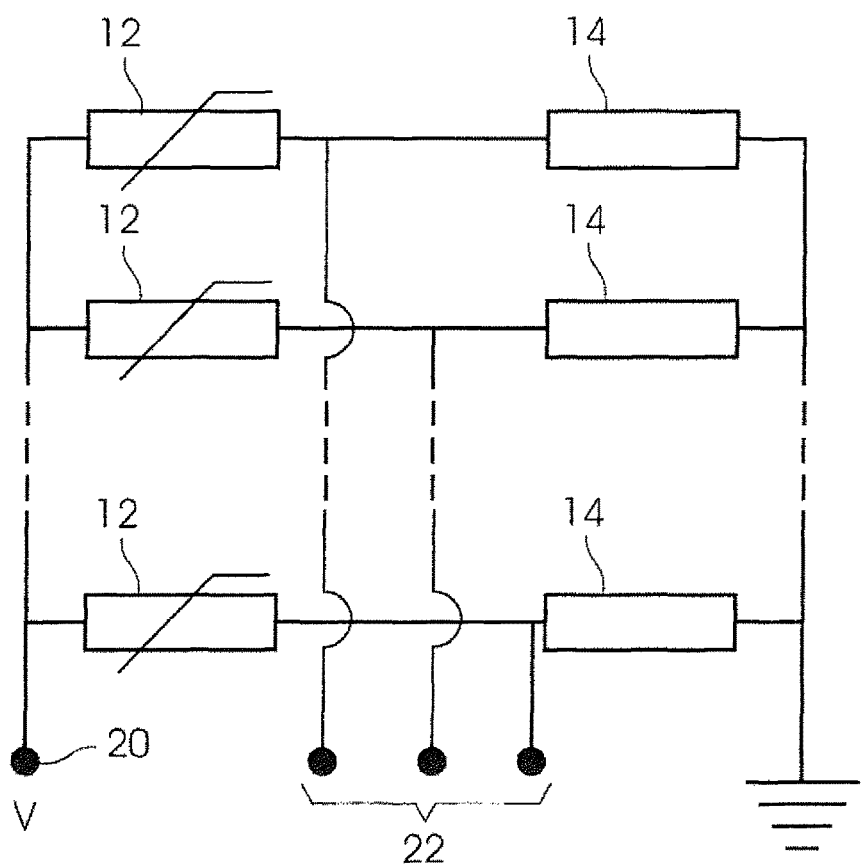
FIG. 3 is a schematic diagram of an example embodiment comprising an array of individually addressed resistive sensors with a common source of potential and one output for each sensor.

In a first embodiment, shown in FIG. 3, the common terminal 20 of each thermistor 12 is connected to the source potential V, and the independent terminal is connected in series with its own fixed measurement resistor 14 to a common ground. Each independent terminal 22 is then connected to the analogue input of the DAQ, while the source potential is provided by a common digital output. The set-up can then be described as either common source or write all-read one.

Figure 4:
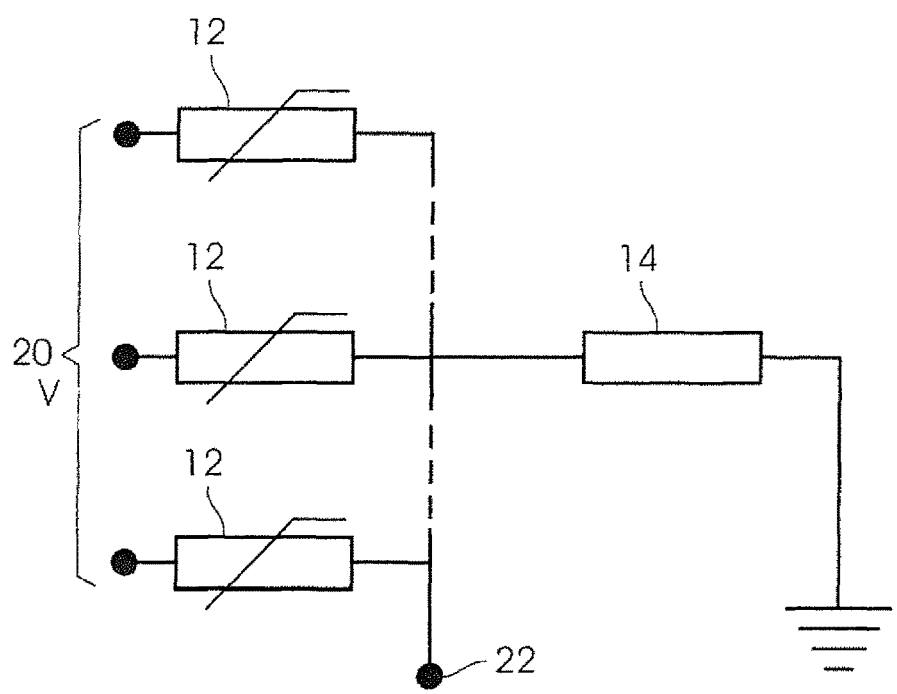
FIG. 4 is a schematic diagram of an example embodiment comprising an array of individually addressed resistive sensors with a common output and a separate source of potential for each sensor.

In a second embodiment, which can be described as common output or write one-read all, as shown in FIG. 4, each thermistor 12 is individually connected to an independent measurement resistor 14. The advantage of this embodiment over the first embodiment is that for an irregular pattern of different thermistors, the measurement resistances can be adapted to the optimal value for the reading of each sensor at its specific temperature of interest, i.e. $R_M$ approximately equal to $R_T$ at that given temperature, which may be different for different regions monitored by the sensor array.

Both of the above embodiments represent a clear technical advantage in terms of simplicity of wiring, as well as ease of fabrication of fabrication over the known prior art of, for example, Schonberger, in which each individual discretely mounted thermistor requires two independent electrical connections in addition to a common ground.

Figure 5:
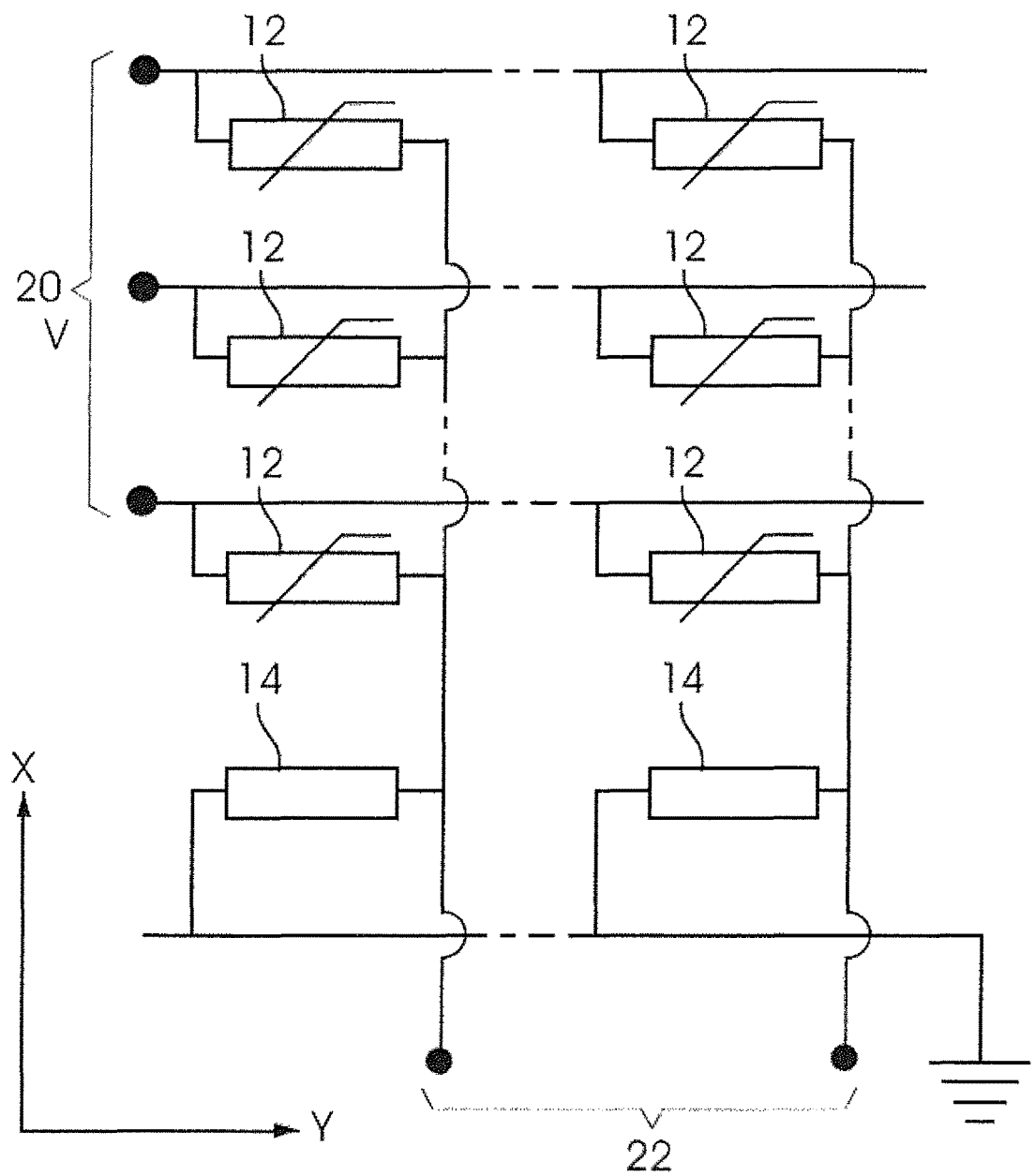
FIG. 5 is a schematic diagram of an example embodiment comprising a write X-read Y addressable passive matrix array of resistive sensors, with each sensor having an independent switchable voltage source and output.

A third preferred embodiment, applicable to higher resolution imaging applications, is shown in FIG. 5. An array of resistive sensors 12 is preferably disposed in a regular pattern, which is preferably rectangular or square, but may be trapezoidal or hexagonal as in the previous embodiments, on the substrate. Furthermore, if the pattern, including the position, size and shape of each individual sensor, is accurately mapped in the representation of the measured temperature, this embodiment could equally be applied to an irregular array of sensors. Each sensor is connected on one side to an independent digital output 22 of the DAQ, corresponding to the X rows in a regular rectangular array. The other side of each sensor is connected to a common ground through a measurement resistor 14, and the central terminal 22 of each sensor is connected to an independent analogue input of the DAQ. These connections correspond to the Y columns in a rectangular array. Hence the instrumental set-up forms a passive matrix array whose principle of operation can be described as write X-read Y. In this embodiment it is desirable, although not essential, to print both the measurement resistor and the conductive traces as well as the temperature dependent resistors rather than combining a printed array of thermistors with discrete components.

The three embodiments described above can be equally applied to any combination of resistive temperature sensors, such as NTC thermistors, PTC thermistors or RTDs, or with any other resistive sensor. For example, an array of piezoresistive sensors on a flexible or conformable substrate could be used to determine and image a pressure profile on a curved surface or a strain profile on a structural element with a complicated shape. Similarly, an array of photoconductive elements could be used for optical, infra-red or ultraviolet imaging.

Sensors as described above would have the additional advantage of being able to detect the proximity of a second object, which is hotter or colder than the object being monitored. Such sensors could therefore either provide an alarm function or a control function, e.g. as a touch panel.

The same principles of operation can be extended to an array of sensor elements whose output is an electric potential. An example would be an array of thermocouples in which a thermoelectric potential is generated, and which could be printed using metallic inks. Other examples would be an array of piezoelectric or photovoltaic elements for mechanical and optical or radiation sensing In this case each element is a voltage source, so the external source and fixed resistors are not needed. However each element will have to be independently connected to an isolation switch (which may be a transistor), in a similar manner to that described by Hadwin et al in EP 2385359 for a temperature sensor array based on the temperature dependent change in capacitance.

The invention claimed is:

1. A sensor device comprising an array of spaced apart temperature sensing elements disposed in a pattern on a substrate, each temperature sensing element comprising:
   a resistive component, the resistive component comprising:

a temperature dependent resistor, deposited by printing on the substrate, wherein the temperature dependent resistor is a printed negative temperature coefficient thermistor comprising:
printed contacts; and
an active material, wherein the active material comprises a printable composition; and
at least one temperature sensing element including a fixed resistor, having a temperature independent resistance, connected in series,
wherein other components of the sensor device, including but not limited to temperature independent resistors, conductive tracks and insulators are also printed on the substrate.

2. The sensor device of claim 1 wherein the sensing elements are connected in a common source or write all-read one configuration.

3. The sensor device of claim 1 wherein the sensing elements are connected in a common output or write one-read all configuration.

4. The sensor device of claim 1 wherein the sensing elements are connected in an array comprising X rows and Y columns, in a write X-read Y configuration.

5. The sensor device of claim 1 wherein either the positioning, or size, or both positioning and size, of the individual sensing elements is selected to allow the sensor device to be matched to the size, shape and form of an object whose temperature profile, or a profile of another physical variable, is to be measured.

6. The sensor device of claim 5 wherein the substrate is flexible or conformable to the shape of an object to be measured.

7. The sensor device of claim 1 wherein the sensing elements are disposed in a pattern which is mapped, in use, in a representation of the measured physical variable.

8. A sensor device comprising an array of spaced apart temperature sensing elements disposed in a pattern on a substrate, each temperature sensing element comprising: a resistive component, the resistive component comprising:
a temperature dependent resistor, deposited by printing on the substrate, wherein the temperature dependent resistor is a printed negative temperature coefficient thermistor comprising:
printed contacts; and
an active material, wherein the active material comprises a printable composition; and
at least one temperature sensing element including a fixed resistor, having a temperature independent resistance, connected in parallel, wherein other components of the sensor device, including but not limited to temperature independent resistors, conductive tracks and insulators are also printed on the substrate.

9. The sensor device of claim 8 wherein the sensing elements are connected in a common source or write all-read one configuration.

10. The sensor device of claim 8 wherein the sensing elements are connected in a common output or write one-read all configuration.

11. The sensor device of claim 8 wherein the sensing elements are connected in an array comprising X rows and Y columns, in a write X-read Y configuration.

12. The sensor device of claim 8 wherein either the positioning, or size, or both positioning and size, of the individual sensing elements is selected to allow the sensor device to be matched to the size, shape and form of an object whose temperature profile, or a profile of another physical variable, is to be measured.

13. The sensor device of claim 12 wherein the substrate is flexible or conformable to the shape of an object to be measured.

14. The sensor device of claim 8 wherein the sensing elements are disposed in a pattern which is mapped, in use, in a representation of the measured physical variable.

* * * * *